United States Patent [19]

Keefe

[11] 3,979,256

[45] Sept. 7, 1976

[54] MONITORING CIRCUIT FOR REACTOR SAFETY SYSTEMS

[75] Inventor: Donald J. Keefe, Lemont, Ill.

[73] Assignee: The United States of America as represented by the United States Energy Research and Development Administration, Washington, D.C.

[22] Filed: Mar. 4, 1975

[21] Appl. No.: 555,330

[52] U.S. Cl. ................................. 176/22; 176/19 J
[51] Int. Cl.² ........................................ G21C 7/00
[58] Field of Search .................. 176/19, 20, 21, 22; 340/253 H, 409, 248 A, 146.1 B, 146.1 BE, 146.1 BA; 324/51, 52, 76, 140 D; 328/145

[56] References Cited
UNITED STATES PATENTS

| | | | |
|---|---|---|---|
| 2,244,369 | 6/1941 | Martin | 171/95 |
| 2,896,165 | 7/1959 | Hornig et al. | 324/140 |
| 3,223,590 | 12/1965 | Troeger | 176/24 |
| 3,255,417 | 6/1966 | Gottlieb | 328/145 |
| 3,456,190 | 7/1966 | Renner | 324/140 |
| 3,689,802 | 9/1972 | Waldmann | 317/27 R |

Primary Examiner—Samuel W. Engle
Assistant Examiner—S. A. Cangialosi
Attorney, Agent, or Firm—Dean E. Carlson; Arthur A. Churm; Walter L. Rees

[57] ABSTRACT

The ratio between the output signals of a pair of reactor safety channels is monitored. When ratio falls outside of a predetermined range, it indicates that one or more of the safety channels has malfunctioned.

3 Claims, 2 Drawing Figures

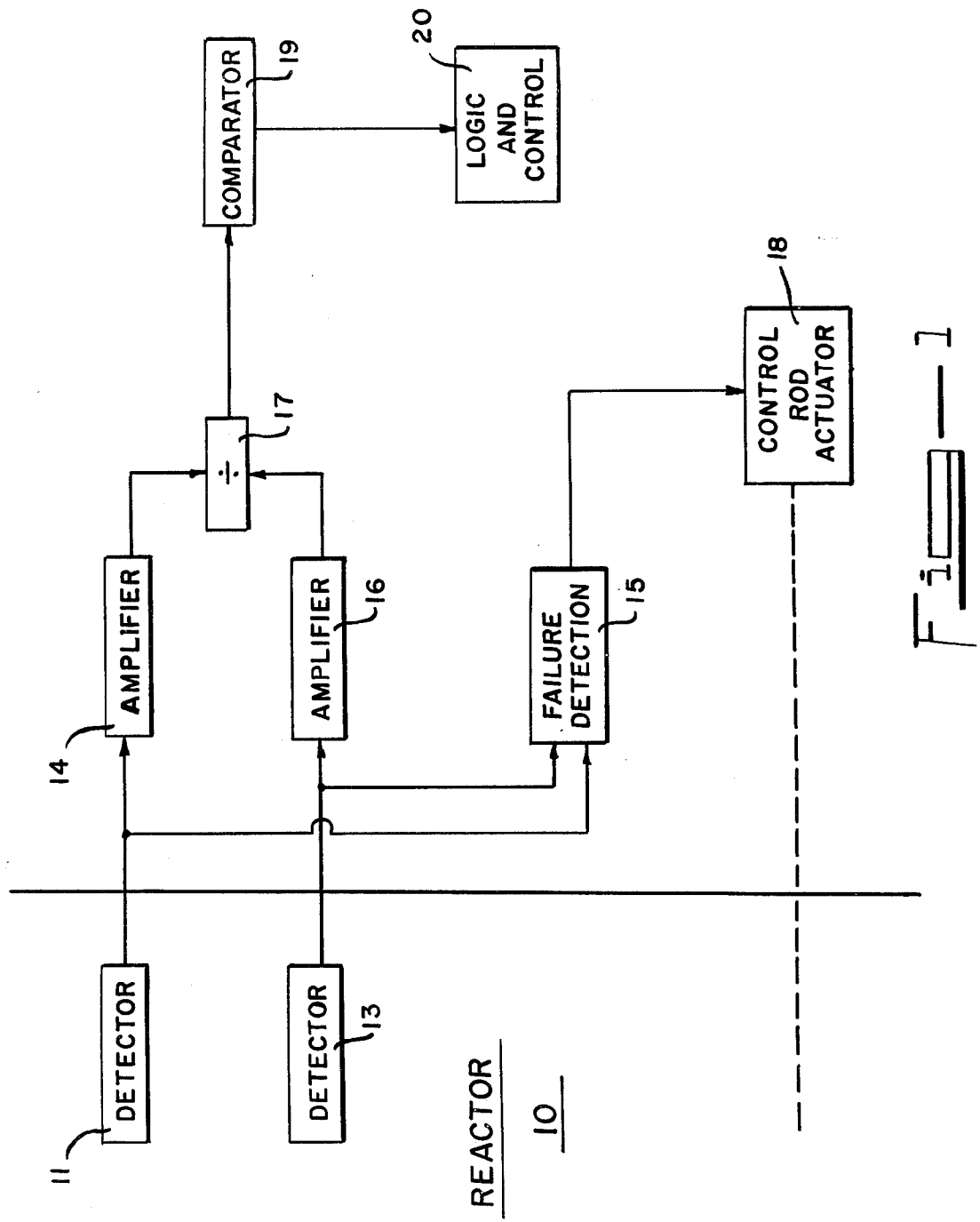

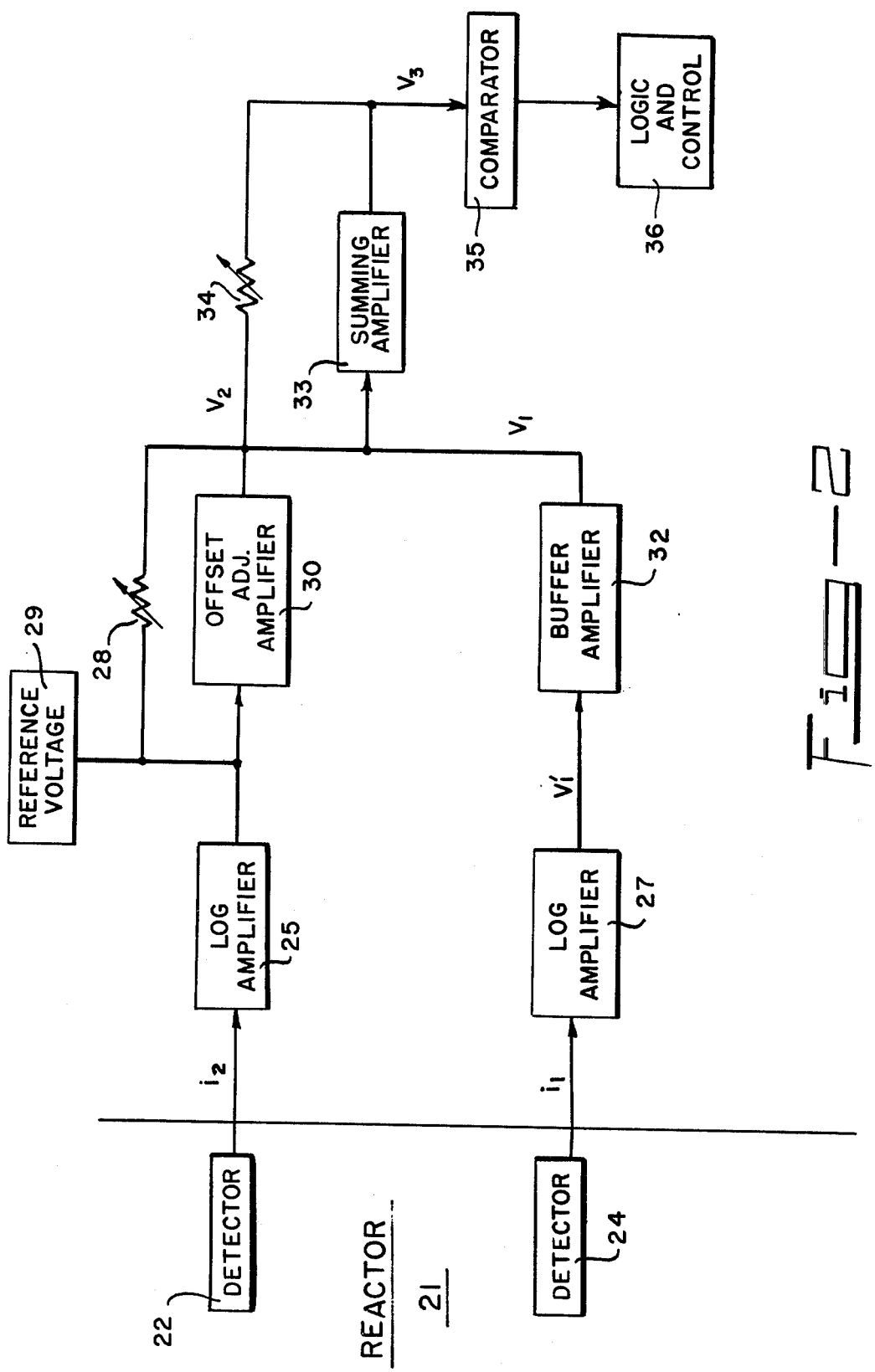

MONITORING CIRCUIT FOR REACTOR SAFETY SYSTEMS

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

A continuous effort is being made to provide increased safety in the operation of nuclear power plants. Standards have been established which require basic reactor control circuits to meet single-failure fail-safe criteria. This means that any single failure of any component should either shut down the reactor or not significantly affect the operation of the safety channel. The growing complexity and cost of reactor installations and operations make it imperative that safety monitoring systems work reliably at all stages and levels of reactor operation. With the advent of larger reactors and electric-power-generating nuclear reactors, it has become important that the reactor not be shut down as long as it is in a safe condition; that is, in the event of some instrument failure which does not affect reactor safety, it is important that the reactor continue to run normally. Schemes such as redundancy, automatic self-checking and others have been used to implement these requirements.

One of the methods used to insure the safe operation of the reactor has been to use coincident trip circuits. Several identical channels (typically at least three) are provided, and at least two of the three channels must indicate a reactor malfunction or unsafe condition before the reactor is shut down. The redundancy of this system provides additional safety. It also provides the possibility of removing one of the safety channels from the system for on-line testing at periodic intervals. By requiring that at least two of the three channels indicate a coincident reactor malfunction or unsafe condition, the probability of a shutdown when the reactor was, in fact, in a safe condition is reduced significantly.

If there are two undetected failures in separate channels and a reactor fault occurs at the same time, the two out of three voting technique would reduce the over-all safety of the reactor, as it would not be protected against this unsafe condition. The reactor might fail to shut down when safety requires that it be shut down or there may be a shutdown of the reactor when, in fact, there was no failure in the reactor but the failure occurred in the safety channels. Also, if one of the safety channels were removed from the reactor for testing, the safety of the system is reduced.

It is therefore an object of this invention to provide an improved monitoring circuit for nuclear reactor safety channels.

Another object of this invention is to provide a circuit for continuously monitoring the safety channels of a nuclear reactor without removing the safety channel from the reactor.

Another object of this invention is to provide a monitoring circuit for reactor safety channels which can operate over a wide dynamic range.

BRIEF DESCRIPTION OF THE INVENTION

In practicing this invention, a control signal is developed which is proportional to the ratio between the output signals from two of the safety channels. As long as both of the channels are operating satisfactorily, the ratio between the output signals from the channels will remain substantially constant over a wide dynamic range. The control signal is monitored by a comparator circuit and, in the event of a failure in one or both of the channels, the deviation of the control signal from the prescribed limits will be detected by the comparator circuit and an alarm signal will be developed. This alarm signal can be used to alert the reactor operating personnel or to shut down the reactor automatically, as desired.

BRIEF DESCRIPTION OF THE DRAWINGS

FIG. 1 is a block diagram of the prior art;

FIG. 2 is a diagrammatic representation of the present invention which consists of a block diagram of the circuit used in carrying out the invention.

DETAILED DESCRIPTION OF THE INVENTION

As shown in FIG. 1, a pair of neutron detectors 11 and 13 are positioned in reactor 10 to measure the neutron flux therein. The outputs from detectors 11 and 13 are coupled to failure detection circuit 15 which acts to detect abnormal values of neutron flux in the reactor and develop control signals in response to abnormal values of neutron flux. The control signals are coupled to other circuits and mechanisms (for example, control rod actuator 18) to shut down or otherwise change the operation of the reactor. The failure detection circuit 15 may include circuit redundancy, voting schemes, automatic self-checking and other features to minimize the chance of reactor shutdown because of a failure in the monitoring circuitry when the reactor was in a safe operating condition.

None of the safety systems which have previously been used have provided for satisfactory continuous monitoring of the safety instrumentation over the entire operating range of the reactor, including startup, intermediate power or full power. In the continuous reactor monitoring system of this invention it is assumed that the entire reactor behaves as a unit; that is, the signals from radiation detectors (or other instruments) located at different positions in the reactor will track to a satisfactory degree over the operating range of the reactor. Thus if a ratio is taken between any pair of radiation detector outputs, this ratio will remain substantially constant over the operating range of the reactor.

Referring again to FIG. 1, the outputs from neutron detectors 11 and 13 are coupled to the division circuit 17 through amplifier circuits 14 and 16. Division circuit 17 develops an output signal which is proportional to the ratio of the signals from detectors 11 and 13. This signal from division circuit 17 is compared to reference signals in comparator 19 to develop an alarm signal when the ratio signal is outside a given range. The alarm signal is coupled to logic and control circuit 20 where it can be utilized as desired. It can, for example, be used to actuate an alarm signal or circuit or provide a display indicating that a safety channel has malfunctioned.

The continuous safety monitor of this invention, for example, could require that a signal proportional to the ratio $i_1/i_2$ of the output currents of two neutron detectors be within a narrow range of values over the operating range of a reactor. Signals proportional to $\log i_1$ and $\log i_2$ will already be available since logarithmic safety channels are in existence on most reactors. A signal proportional to log ($i_1/i_2$) is easily obtained by taking the difference between two logarithmic channels. The logarithm of the ratio serves as well as the ratio since, for small variations of the ratio about unity:

$$\log (i_1/i_2) \approx K_{10} (i_1/i_2 - 1)$$

where $K_{10}$ is the inverse of the natural logarithm of 10 needed for conversion to common logarithms which are convenient in the operation of the continuous safety monitor.

In FIG. 2 there is shown a continuous safety monitor using the logarithmic safety channels of a reactor. A pair of neutron flux detectors 22 and 24 are positioned within the reactor 21 and measure the flux of the reactor at different points. The output signal $i_2$ from detector 22 is coupled to a log amplifier 25 and the output signal $i_1$ from detector 24 is coupled to a log amplifier 27. The output signals from log amplifiers 27 and 25 are:

$$V_1' = -(V_{d1}' \log i_1 + V_{10}') \quad (1)$$

$$V_2' = (V_{d2}' \log i_2 + V_{20}') \quad (2)$$

where $V_{d1}'$ and $V_{d2}'$ are the average volts per decade, constants of amplifiers 27 and 25 and $V_{10}'$ and $V_{20}'$ are the dc offset voltages of the amplifiers. Signal $V_2'$ is combined with a reference voltage from reference voltage source 29 and the combined signal is coupled to offset adjustment amplifier 30. The output signal from amplifier 30 is:

$$V_2 = (V_{d2} \log i_2 + V_{20}) \quad (3)$$

The output signal $V_1'$ from amplifier 27 is coupled to buffer amplifier 32 where it is amplified to develop the signal:

$$V_1 = -(V_d \log i_1 + V_{10}) \quad (4)$$

The polarities of the amplifiers 25, 27, 30 and 32 are such that the output signals have the desired polarities.

The gain of amplifier 30 is set by adjusting the impedance of the feedback loop, represented by variable resistor 28, so that the volts per decade constant $V_{d2}$ is substantially equal to $V_d$. Thus equation (3) becomes $$V_2 = (V_d \log i_2 + V_{20}) \quad (5)$$

Signals $V_1$ and $V_2$ are combined and amplified in summing amplifier 33 to develop an output signal $V_3$:

$$V_3 = -G(V_1 + V_2) \quad (6)$$

where G is the gain of amplifier 33 and is established by the variable impedance 34 in the feedback loop of amplifier 33. From equations (3) and (5):

$$V_3 = -G(-V_d \log i_1 - V_{10} + V_d \log i_2 + V_{20}) \quad (7)$$

$$V_3 = G(V_d \log i_1/i_2) + G(V_{10} - V_{20}) \quad (8)$$

$$V_{10} - V_{20} = D \quad (9)$$

$$V_3 = GV_d \log i_1/i_2 + GD \quad (10)$$

Thus the output signal $V_3$ coupled to comparator 35 is proportional to log ($i_1/i_2$) plus an offset signal GD. Signal $V_3$ is compared in comparator 35 with an upper limit voltage and a lower limit voltage and an alarm signal is developed if the voltage $V_3$ falls outside of this range of voltage. The voltage range can be adjusted as desired to provide the desired monitoring and safety. The alarm signal from comparator 35 is coupled to the logic and control circuit 36 where it can be used to sound an alarm or to actuate a display as desired.

The offset voltage GD is used to make the system failsafe against any failure which causes $V_3$ to go to zero. For example, if $i_1$ and $i_2$ were substantially equal, log ($i_1/i_2$) would be zero and comparator 35 would be set to monitor voltages centered about zero. A short circuit or other failure at the output of amplifier 33 which would develop a zero output signal would indicate that the safety channels were performing satisfactorily when, in fact, there might have been a failure in one of the channels. By proper selection of the offset voltage a failure in the continuous safety monitoring system which causes $V_3$ to go to zero would be detected. The offset voltage GD is also chosen so that malfunction which causes amplifier 33 to go to either positive or negative saturation would also be detected. GD is set by adjusting the magnitude of the reference voltage from the reference voltage source 29 and by adjusting the gain of amplifier 33. An example of the values which were used in a prototype circuit GD was set at +5V. The upper and lower voltage levels detected by comparator 35 were set at +8V and +2V, which gave a range of 6V centered about the offset voltage GD.

Under ideal circumstances the ratio $i_1/i_2$ would remain constant over a wide range of currents. However, in practice a certain amount of variation can be expected. For example, variation could be caused by instrument error or neutron flux differences at different locations of the neutron flux detectors. Thus, $V_3$ must be outside of a particular voltage range before an alarm is given. However, this voltage range is constant over a wide reactor operating range while in the case of a system which used the algebraic difference between the signals from the detectors the voltage range would have to increase at large reactor power levels to values which would make the safety monitoring useless.

Thus the continuous safety monitoring system can operate continuously over a wide range of reactor operation while prior art systems cannot operate either continuously or over the reactor operating range or both. While the continuous reactor monitoring system of this invention has been described in conjunction with the measurement of neutron flux, other reactor parameters, as for example coolant temperature, could be measured.

The embodiments of the invention in which an exclusive property or privilege is claimed are defined as follows:

1. In a nuclear reactor which includes first and second reactor safety channels coupled to the reactor, each of the first and second reactor safety channels being responsive to the same reactor parameter to develop first and second measurement signals respectively, with each of the first and second measurement signals having a magnitude which is a function of the reactor parameter being measured, a safety circuit for continuously monitoring the first and second reactor safety channels, comprising: first and second log amplifiers coupled to said first and second safety channels respectively, said first and second log amplifiers being responsive to said first and second measurement signals to develop first and second log measurement signals proportional to the log of said first and second measurement signals respectively, a summing circuit to which said log amplifiers are coupled developing a ratio signal being the subtraction of one of said log measurement signals from the other of said log measurement signals, an offset voltage circuit coupled to one of said first and second log amplifiers for applying a reference dc voltage thereto so that with the absolute values of said log measurements equal said ratio signal has a desired nonzero value, and a comparator circuit coupled to said summing circuit and responsive to said ratio signal to develop an alarm signal with the magnitude of said ratio signal being outside of a predetermined range of magnitudes.

2. The safety circuit of claim 1 wherein the absolute values of said predetermined range of magnitudes of said ratio signal are greater than zero and less than the magnitude which would exist with one of said log amplifiers being saturated.

3. The safety circuit of claim 2 further including control means coupled to said comparator means and responsive to said alarm signal to give a display thereof and to scram the reactor.

* * * * *